US007078606B2

(12) United States Patent
Tanaka

(10) Patent No.: US 7,078,606 B2
(45) Date of Patent: Jul. 18, 2006

(54) CUP MEMBER FOR HIGH HAT STAND

(75) Inventor: Yukio Tanaka, Chiba (JP)

(73) Assignee: Pearl Musical Instrument Co., Chiba (JP)

( * ) Notice: Subject to any disclaimer, the term of this patent is extended or adjusted under 35 U.S.C. 154(b) by 0 days.

(21) Appl. No.: 10/893,997

(22) Filed: Jul. 20, 2004

(65) Prior Publication Data

US 2005/0150357 A1 Jul. 14, 2005

Related U.S. Application Data

(60) Provisional application No. 60/536,256, filed on Jan. 14, 2004.

(51) Int. Cl.
*G01D 13/02* (2006.01)

(52) U.S. Cl. .................... 84/422.1; 84/422.2; 84/422.3

(58) Field of Classification Search ............... 84/422.1, 84/422.2, 422.3
See application file for complete search history.

(56) References Cited

U.S. PATENT DOCUMENTS 6,054,645 A * 4/2000 Gauger ...................... 84/422.3

* cited by examiner

*Primary Examiner*—Kimberly Lockett
(74) *Attorney, Agent, or Firm*—Berenato, White & Stavish LLC

(57) ABSTRACT

A high hat stand includes a cymbal receiving plate journaled to a main mounting body. An adjustable bolt, for adjusting the pivot orientation around the journal of the receiving plate with respect to the mounting body, passes through the receiving plate so that as a nut is tightened on the bolt the receiving plate is tilted with respect to the mounting body. A biasing spring may also be interposed between the receiving plate and the mounting body. A cushion may be disposed between the plate and the cymbal.

12 Claims, 4 Drawing Sheets

Fig. 1
Prior Art
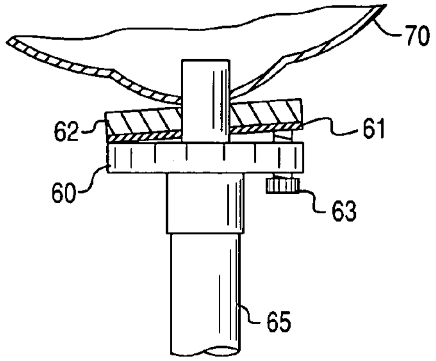
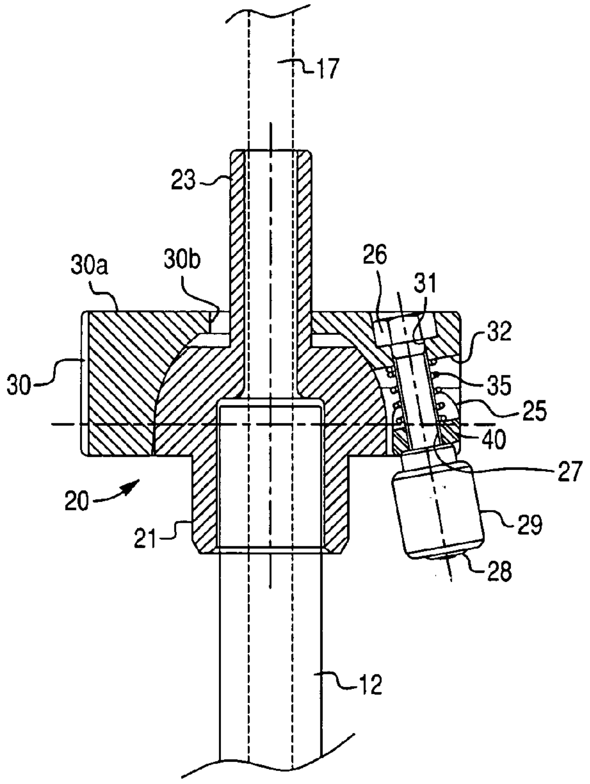
Fig. 3
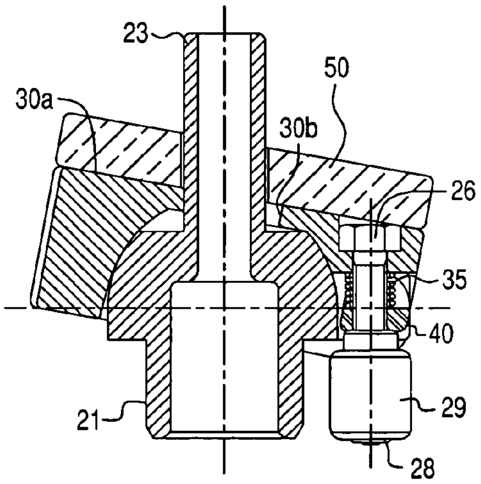
Fig. 4

CUP MEMBER FOR HIGH HAT STAND

CROSS-REFERENCE TO RELATED APPLICATION

This Application claims the benefit under 35 U.S.C. 119(e) of U.S. Provisional Application No. 60/536,256 filed Jan. 14, 2004 by Yukio TANAKA.

BACKGROUND OF THE INVENTION

1. Field of the Invention

The present invention relates to a cymbal receiving mechanism of a high hat stand and more particularly to means which support and enable adjustable tilting of the supported cymbal.

2. Description of Related Art

Generally, a high hat stand comprises two relatively movable, cooperating cymbals, a shaft for moving one of the cymbals and a pedal connected with the one cymbal.

In a conventional high hat stand, a support for a cymbal includes a flat surface plate that is provided on a main receiving body. The receiving body is installed on a stationary pipe on the high hat stand. There may be a cushion between the flat surface of the plate and the cooperating supported surface of the cymbal. Usually, the bottom of the cymbal is convexly curved so that there is a stability problem when the cymbal sits on the flat surface of the plate. Some lifting means, such as an uplifting bolt, tilts the flat surface plate with respect to the body which tilts the cymbal by pushing up one edge of the plate on which the cymbal is seated. In such a case, however, the contact area between the main cymbal receiving body and the plate tends to shift. Maintenance of the orientation of the cymbal becomes unstable and difficult to manage.

A cymbal support of a conventional high hat stand is shown in FIG. 1. A flat plate is provided on a main mounting body 60. The body 60 is installed on a stationary pipe 65. The cymbal 70 is supported on a cushion 62 of felt, etc. When the cymbal is tilted on the stand for convenience of use, it has been necessary to screw an uplifting bolt 63 to the aforementioned mounting body 60, to tilt the cymbal 70 by pushing up one edge of the plate 61. In such a case, however, there is no positive connection between the plate and the body. As a result, maintenance of the cymbal orientation becomes more unstable. The invention overcomes these problems with the prior art.

SUMMARY OF THE INVENTION

The object of this invention is to improve the stability of a high hat stand, and particularly the support of a cymbal on the stand, to drastically improve the musical performance quality with the cymbal.

A cymbal receiving mechanism of a high hat stand includes a cymbal receiving plate. At one lateral side, the cymbal receiving plate is journaled on a main mounting body. A tilting or adjustment mechanism, e.g. in the form of a spring-biased bolt, is operable to tilt the cymbal receiving plate. The bolt passes from the receiving plate through an adjustment base of the main mounting body then mates with an adjustment nut on the opposite side of the adjustment base of the mounting body. The bolt is freely adjustable on the main mounting body to thereby adjust the tilt angle of the receiving plate.

Other objects and features of this invention are explained below on the basis of the drawings and associated description.

BRIEF DESCRIPTION OF THE DRAWINGS

FIG. 1 is a cross section of a prior art cymbal support.

FIG. 3 is a cross section of the cymbal support in the horizontal state.

FIG. 4 is a cross section of the cymbal support in the tilted state.

DESCRIPTION OF A PREFERRED EMBODIMENT

Figure 2:
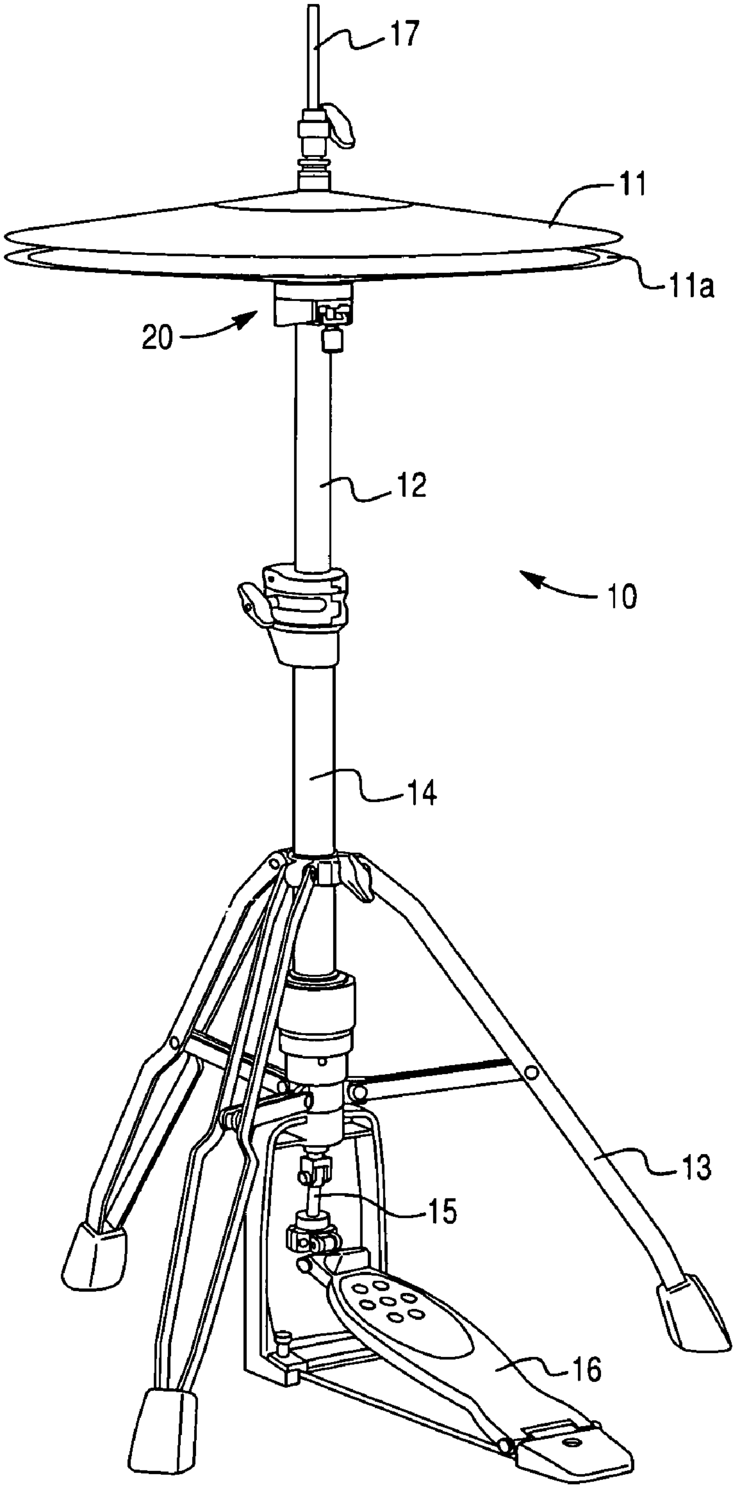
FIG. 2 is a perspective view of a high hat stand in which the invention is incorporated.

A high hat stand 10 shown in FIG. 2 comprises an upper movable cymbal 11, a lower stationary cymbal 11*a*, an internal, longitudinally movable support pipe 12 which supports the lower cymbal 11*a*, an external stationary tube 14 around the pipe 12 and supported on a tripod, and a foot pedal 16 which is connected to the lower end of the operating axis 17 via a connecting member 15 so that the pedal 16 moves the operating axis 17 and upper cymbal 11 up and down.

A cymbal receiving support 20 for stationary lower cymbal 11*a* is provided on top of the pipe 12. The lower cymbal 11*a* is maintained to face open upward. There is a cymbal operating axis 17 on which the movable upper cymbal 11 is supported above the lower cymbal 11*a*.

With reference to FIGS. 2 and 3, the cymbal support 20 is disposed on the post 12 for supporting the lower cymbal 11*a*. The cymbal support 20 comprises a main mounting body 21 and a cymbal receiving plate 30 which is held on the mounting body 21 in a tiltable manner. The main mounting body 21 includes a stepped central bore which receives the end of the pipe 12 in its enlarged lower end. The main mounting body 21 has an upper tubular part 23 having a reduced diameter through which the cymbal operating axis 17 is inserted.

The adjustment assembly between the receiving plate 30 and the mounting body 21 will now be described with reference to FIGS. 3–6. As shown in FIGS. 3 and 6, a first through hole 27 is formed in the free-floating member 40 pivotally disposed on two support legs of the main mounting body 21. A second through hole 31 is formed in the receiving plate 30, wherein the first and second through holes 27, 31 are axially aligned. As shown in FIG. 6, an adjustment bolt 26 for adjusting the tilt of the lower side cymbal 11*a* is inserted into the second through hole 31 from the upper side of the receiving plate 30 then through the first through hole 27 of the main mounting body 21. The head of the bolt 26 is disposed in a recess formed in the receiving plate 30.

By means of lock nut 28 and an adjusting nut 29, the adjustment bolt 26 is screwed into a selected position which is freely adjustable. The lock nut 28 has locking material, such as nylon, on its threads to prevent unthreading of the lock nut 28 from the adjustment bolt 26. Cooperation of biasing spring 35, the lock nut 28 and the adjustment nut 29 prevents loosening of the bolt 26 or disassembly of the entire assembly. The biasing spring 35 is disposed between a lower surface 32 of the receiving plate 30 and the free-floating member 40 disposed on the support legs of the main mounting body 21. The free-floating member 40 is disposed in the adjustment base to permit relative movement between the receiving plate 30 and the main mounting body 21.

The cymbal receiving plate 30 has an upwardly facing dish surface 30*a*. The upper tubular part 23 of the main mounting body 21 is aligned with and passes through a central hole 30*b* in the cymbal receiving plate 30.

FIG. 4 is a cross section of the cymbal support in the tilted state. The cymbal receiving plate 30 is journaled on the main mounting body 21 to be freely movable along the arcuate mating surfaces of the pivot journal between the receiving plate 30 and mounting body 21. The cymbal receiving plate 30 is pivoted to a tilted orientation and is then held there by the adjustment bolt 26 that has been inserted from the through holes 31 and 27 in the receiving plate 30 and the free-floating member 40, respectively, and locked in the tilted orientation by the lock nut 28 and the adjusting nut 29.

A cushion 50 comprised of felt, or the like, may be attached by an adhesive layer on the cymbal receiving plate 30. The cushion 50 has a central hole through which the tubular portion 23 of the mounting body 21 is inserted.

Figure 5:
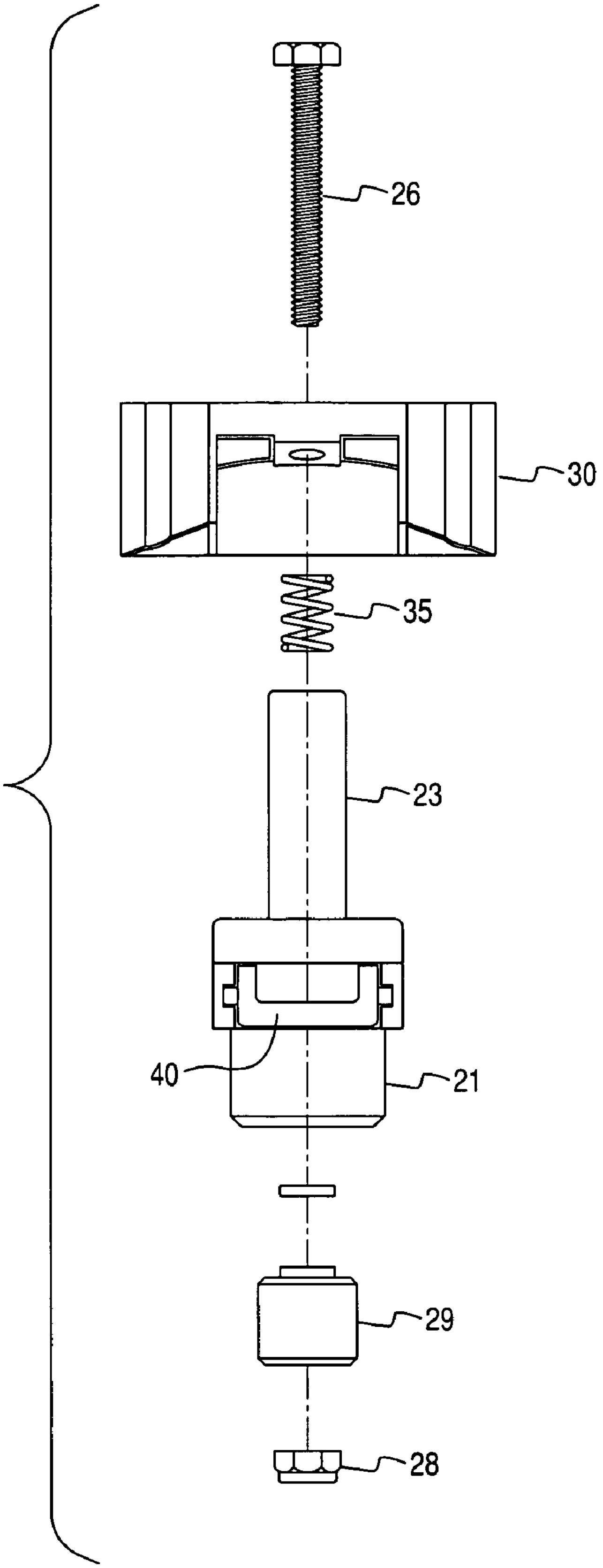
FIG. 5 is a right side view of the cymbal support taken along line V—V of FIG. 3.
Figure 6:
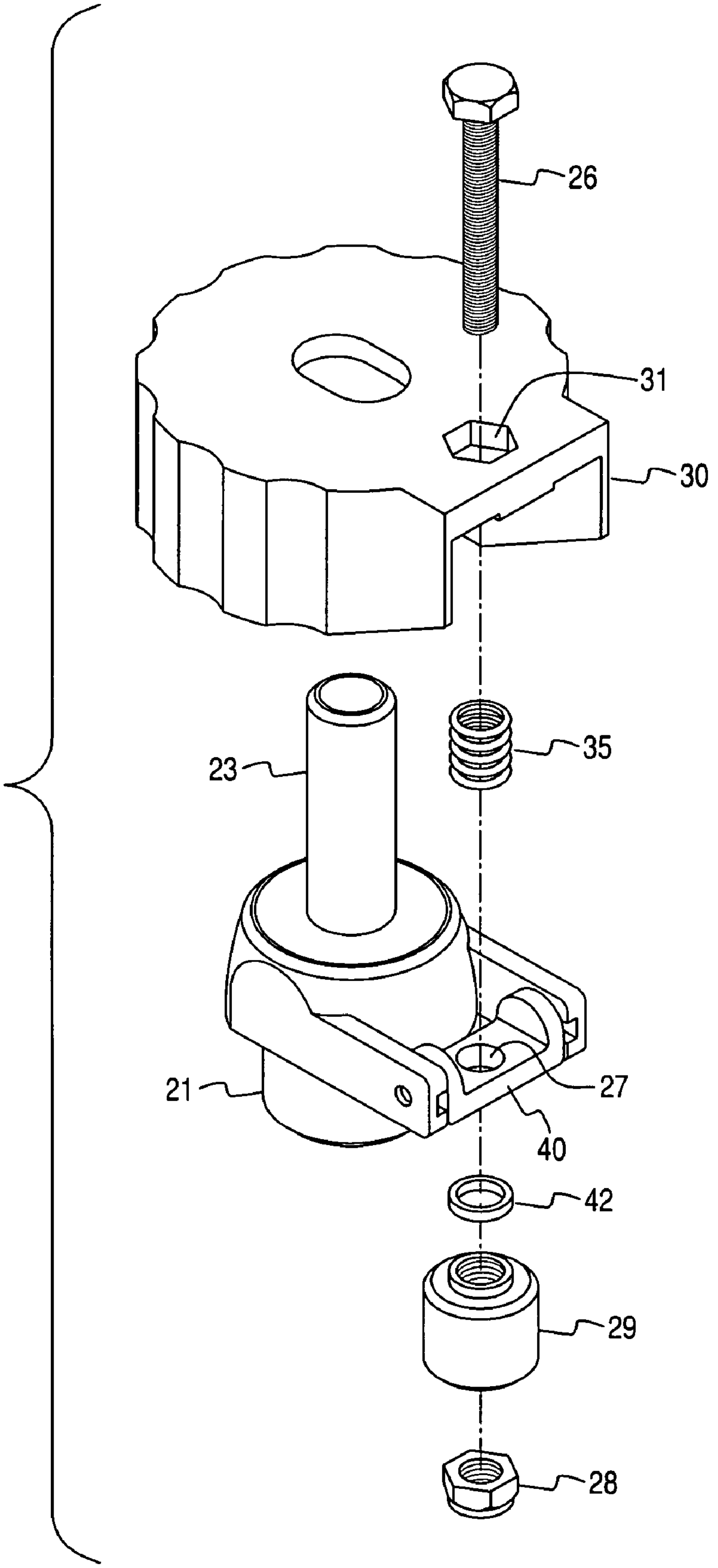
FIG. 6 is an exploded, perspective view of the cymbal support illustrated in FIGS. 2–4.

FIGS. 5 and 6 provide additional views of the cymbal support of FIGS. 2–4. As shown in FIG. 6, the free-floating member 40 is pivotally disposed on two support legs of the main mounting body 21 to accommodate the pivoting action of the cymbal receiving plate 30.

Adjusting nut 29 is threaded onto the bolt 26, and the adjusting nut 29 acts on the free-floating member 40 to pull the receiving plate 30 toward the tilted position shown in FIG. 4.

In the preferred embodiment, a resilient bearing member 42 is interposed between the adjusting nut 29 and the free-floating member 40.

Since the plate is journaled on the main receiving body, the cymbal does not shake when the cymbal is tilted during the performance, which can markedly improve the performance. Since the main body and plate are held together integrally, there is no danger of dropping or loss at the time of transportation.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A cymbal receiving mechanism for a high hat stand, comprising:
- a cymbal receiving plate having a cymbal receiving side to receive a bottom side of a cymbal;
- a main mounting body upon which is mounted the cymbal receiving plate, said main mounting body having an upper part passing through said cymbal receiving plate;
- a cymbal operating axis passing through said upper part and said cymbal receiving plate;
- a pivot journal between the cymbal receiving plate and the main mounting body such that the cymbal receiving plate may be pivoted to different tilt orientations with respect to the main mounting body;
- an adjustment assembly interconnecting the receiving plate and the main mounting body for adjusting an orientation of the receiving plate with respect to the main mounting body about the pivot journal;
- wherein said adjustment assembly comprises a member passing at least partly through said receiving plate.

2. A cymbal receiving mechanism for a high hat stand, comprising:
- a cymbal receiving plate having a cymbal receiving side to receive a bottom side of a cymbal;
- a main mounting body upon which is mounted the cymbal receiving plate;
- a pivot journal between the cymbal receiving plate and the main mounting body such that the cymbal receiving plate may be pivoted to different tilt orientations with respect to the main mounting body;
- an adjustment assembly interconnecting the receiving plate and the main mounting body for adjusting an orientation of the receiving plate with respect to the main mounting body about the pivot journal;
- a free-floating member pivotally mounted with respect to said main mounting body;
- wherein said adjustment assembly comprises a member passing at least partly through said receiving plate.

3. The cymbal receiving mechanism of claim 2, wherein the adjustment assembly comprises an adjustment bolt and an adjustment nut, said adjustment bolt extending through the receiving plate and the free-floating member for tilting the receiving plate with respect to the mounting body as the adjustment nut is rotated.

4. The cymbal receiving mechanism of claim 3, wherein a head of the bolt is disposed in a recess formed in the cymbal receiving side of the receiving plate.

5. A cymbal receiving mechanism for a high hat stand, comprising:
- a cymbal receiving plate having a cymbal receiving side to receive a bottom side of a cymbal;
- a main mounting body upon which is mounted the cymbal receiving plate;
- a pivot journal between the cymbal receiving plate and the main mounting body such that the cymbal receiving plate may be pivoted to different tilt orientations with respect to the main mounting body;
- an adjustment assembly interconnecting the receiving plate and the main mounting body for adjusting an orientation of the receiving plate with respect to the main mounting body about the pivot journal;
- wherein said adjustment assembly comprises a member passing at least partly through said receiving plate, and wherein the adjustment assembly comprises a locking nut and an adjustment nut threaded onto an adjustment bolt passing through said receiving plate.

6. The cymbal receiving mechanism of claim 1, further comprising a cushion on the cymbal receiving side of the receiving plate.

7. A cymbal receiving mechanism for a high hat stand, comprising:
- a cymbal receiving plate having a cymbal receiving side to receive a bottom side of a cymbal;
- a main mounting body upon which is mounted the cymbal receiving plate;
- a pivot journal between the cymbal receiving plate and the main mounting body such that the cymbal receiving plate may be pivoted to different tilt orientations with respect to the main mounting body;
- an adjustment assembly interconnecting the receiving plate and the main mounting body for adjusting an orientation of the receiving plate with respect to the main mounting body about the pivot journal;
- a post extending up from the main mounting body at a height to extend past the receiving plate and the cymbal, wherein a hole in the center of the receiving plate through which for the post extends is sufficiently sized that the post will not substantially interfere with tilting of the receiving plate;

wherein said adjustment assembly comprises a member passing at least partly through said receiving plate.

8. The cymbal receiving mechanism of claim 1, further comprising the high hat stand having a base and the body being carried on the base;

a second cymbal supported to the base and means for moving the second cymbal into contact with the first cymbal on the cymbal receiving mechanism.

9. The cymbal receiving mechanism of claim 2, further comprising a biasing spring disposed between the receiving plate and the free-floating member disposed on the mounting body.

10. A cymbal receiving mechanism for a high hat stand, comprising:

a cymbal receiving plate having a cymbal receiving side to receive a bottom side of a cymbal;

a main mounting body upon which is mounted the cymbal receiving plate;

a pivot journal between the cymbal receiving plate and the main mounting body such that the cymbal receiving plate may be pivoted to different tilt orientations with respect to the main mounting body;

an adjustment assembly interconnecting the receiving plate and the main mounting body for adjusting an orientation of the receiving plate with respect to the main mounting body about the pivot journal;

a biasing spring biasing a portion of said receiving plate away from the mounting plate;

wherein said adjustment assembly comprises a member passing at least partly through said receiving plate.

11. The cymbal receiving mechanism of claim 2, wherein the free-floating member is adapted to pivot with respect to the mounting body as the receiving plate is adjusted to said different tilt orientations.

12. The cymbal receiving mechanism of claim 5, wherein the adjustment bolt passes through an aperture in the receiving plate.

* * * * *